E. B. WINGATE.
Nut and Bolt Fastenings.

No. 134,963.  Patented Jan. 14, 1873.

Witnesses
Jas. L. Ewin
Walter Allen

Inventor.
Edward B. Wingate
By Knight Bros
Attorneys

UNITED STATES PATENT OFFICE.

EDWARD B. WINGATE, OF FRIENDSHIP, NEW YORK.

IMPROVEMENT IN NUT AND BOLT FASTENINGS.

Specification forming part of Letters Patent No. 134,963, dated January 14, 1873.

*To all whom it may concern:*

Be it known that I, EDWARD B. WINGATE, of Friendship, in the county of Allegany and State of New York, have invented a certain Improved Self-Locking Nut, of which the following is a specification:

Nature and Objects of the Invention.

This invention relates to those means for preventing nuts from unscrewing which are contained within the nuts, and which are adapted to be manipulated to release the nuts. The first part of the invention consists in a dog, constructed with a projecting lever-extension for the finger or thumb to engage with in releasing the nut. The second part of the invention consists in arranging the locking-dog in a vertical recess in the nut, so as to engage with the seat thereof.

Description of the Drawing.

Figs. 1 and 3 are plan views, partly in section, on the lines $a$ and $c$, Figs. 2 and 4. Figs. 2 and 4 are vertical sections on the lines $b$ and $d$, Figs. 1 and 3.

General Description.

Figure 3:
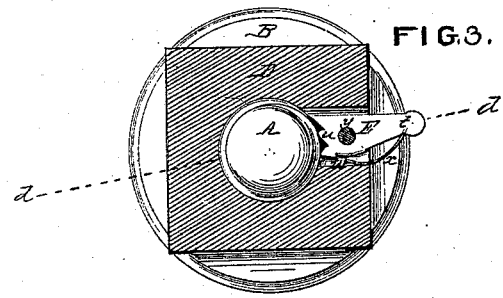
Figs. 3 and 4 illustrate an inferior modification.
Figure 4:
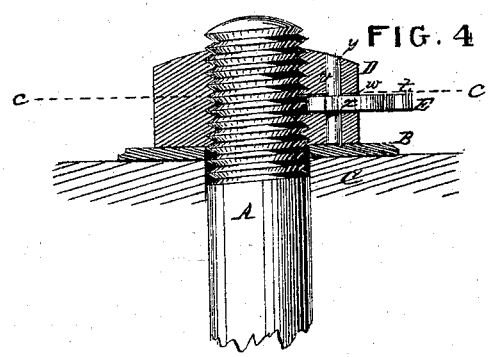
Figure 1:
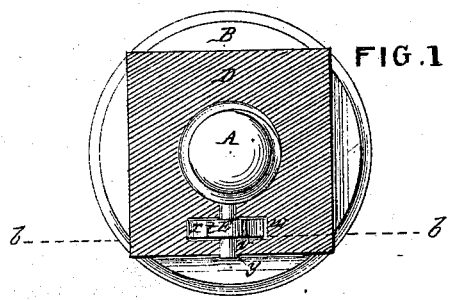
Figures 1 and 2 illustrate the invention in a preferred form.
Figure 2:
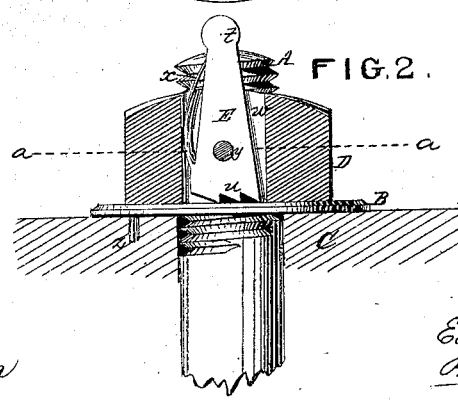

In the respective figures of the drawing, A represents a common screw-bolt, and B a washer employed therewith, when the object C, to which the bolt is applied, is wood; this washer being held, if necessary, by a spur, $z$, or its equivalent. D represents a nut, which may be of any preferred shape. The invention relates exclusively to this latter; and consists in means for locking the same from unscrewing, so that it shall not yield to jars, but may readily be released, when desired, by means of the fingers without the use of tools. For this purpose a dog, E, with pivot $y$ and spring $x$, is provided, and the nut is constructed with a recess, $w$, and an intersecting perforation, $v$, to receive the same. The recess $w$ may be a simple rectangular perforation, the spring $x$ being attached to the dog, as represented; or a spring of any preferred form may be secured in the recess. The recess is, preferably, vertical, as illustrated in Figs. 1 and 2, the dog engaging with the metallic seat of the nut; but the dog may engage with the thread of the screw, as illustrated in Figs. 3 and 4. The dog is constructed with a face, $u$, composed, preferably, of a plurality of biting points or teeth, and with a lever-extension, $t$, projecting outside of the nut, by which to disengage the dog. As arranged to engage with the seat of the nut, the dog does not obstruct the sides of the nut, and does not impair the thread as when applied horizontally so as to engage with the bolt. It is preferable, also, as ceasing to act when the nut leaves its seat.

In applying the nut the resistance of the dog is at the backs of the teeth, and opposed to the pressure of the spring, which yields, and the dog slips easily on the engaging-surface. The bite of the dog prevents any backward movement while the dog is in active position; but, to release the nut it is only necessary to press back the projecting end of the dog with the finger, when the nut may be unscrewed even without a wrench.

It is known that spring-catches and differently-constructed dogs have been applied to nuts so as to engage with the thread of the bolt, as in the inferior modification above described; and that nuts have been constructed with notched faces to engage with catches applied to the washers thereof; but the above-described construction of locking-dog, and the arrangement thereof in a nut, so as not to obstruct the sides thereof, and so as to engage with the seat of the nut, is believed to be new.

Claim.

The following is therefore claimed as new:

A screw-nut, D, having a pivoted dog, E, arranged in a vertical recess, $w$, so as to engage with the seat of the nut, and constructed and operating substantially as herein described.

EDWARD B. WINGATE.

Witnesses:
 L. B. SCOTT,
 FRANK STEVENS,